3,183,122
FUEL CELL
Joseph C. White, Hyattsville, Md., and Sigmund Schuldiner, Washington, D.C., assignors to the United States of America as represented by the Secretary of the Navy
Filed Nov. 9, 1959, Ser. No. 851,924
4 Claims. (Cl. 136—86)
(Granted under Title 35, U.S. Code (1952), sec. 266)

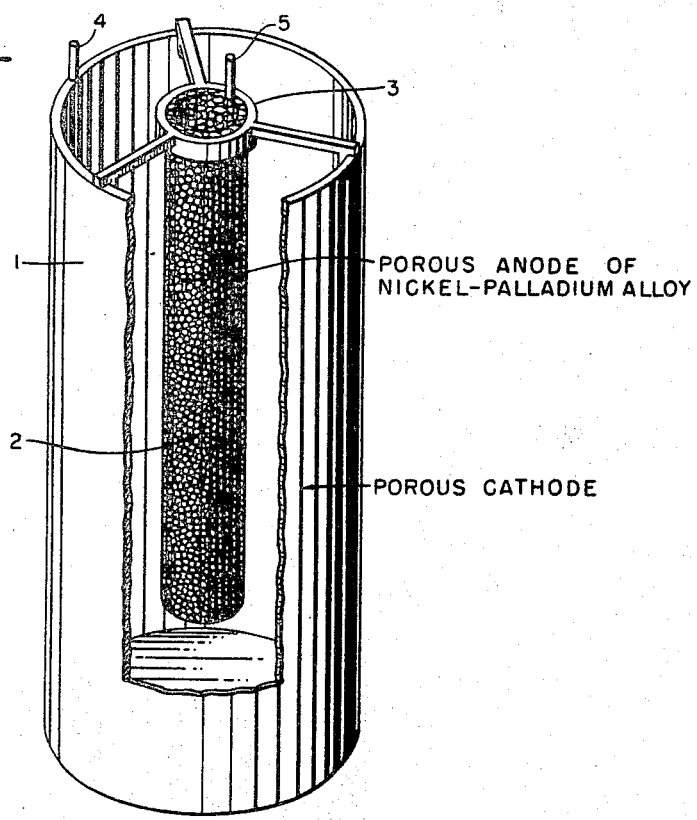
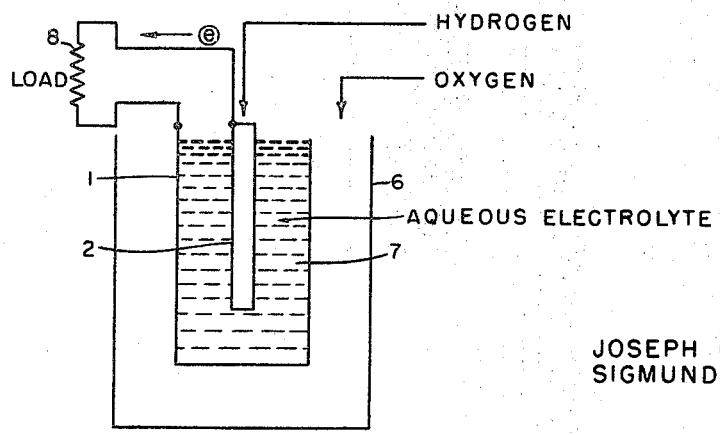

The invention described herein may be manufactured and used by or for the Government of the United States of America for governmental purposes without the payment of any royalties thereon or therefor.

The present invention relates to improvements in electrochemical power generators or fuel cells.

Fuel cells of the hydrogen-oxygen type of the prior art operate with an aqueous alkaline elctrolyte, usually a solution of potassium hydroxide, and comprise a pair of hollow porous electrodes, the one functioning as the anode or hydrogen electrode and the other as the cathode or oxygen electrode. The surface of the electrodes which is in contact with the entering gas is made water-repellant. An external circuit containing a load is connected to the electrodes for power take-off from the fuel cell.

In operation of the fuel cells, hydrogen is delivered to the hollow anode and oxygen to the hollow cathode. The hydrogen diffuses through the porous wall of the anode and the oxygen through the porous wall of the cathode to react with the water of the aqueous alkaline electrolyte at the surface of the respective electrodes. At the anode, hydrogen becomes dissociated into a pair of hydrogen atoms which then ionize in the aqueous electrolyte to yield a pair of hydrogen ions and a pair of electrons following the equation:

(1) $$H_2 \rightarrow 2H^+ + 2e$$

The electrons travel through the external circuit and, after performing work at the load, return to the cell at the cathode where they enter into reaction with oxygen and water at the interface of the cathode and elecrolyte to form hydroxyl ions in accordance with the equation:

(2) $$O_2 + 2H_2O + 4e \rightarrow 4OH^-$$

Hydrogen ions and hydroxyl ions in the aqueous electrolyte react to form water in accordance with the general equation:

(3) $$2H_2 + O_2 \rightarrow 2H_2O$$

so that the ultimate products of the operation of the fuel cell are water and current.

The efficiency or current output of the fuel cell depends, primarily, on the rate of dissociation of molecular hydrogen to atomic hydrogen at the anode, the faster the rate of this dissociation the greater the current output and higher the efficiency of the fuel cell.

The present invention has for a general object the provision of fuel cells of the hydrogen-oxygen type of improved efficiency. A particular object is to provide a new hollow porous electrode which in use as the anode in fuel cells of the type described will promote dissociation of hydrogen in operation of the cells. Another object is the provision of a new porous electrode pair for fuel cells of the type described which will provide higher efficiency in operation of the fuel cells.

The above and other objects can be accomplished in accordance with our invention by employing in fuel cells of the hydrogen-oxygen type an anode which is a hollow porous electrode made of a nickel-palladium alloy in which palladium is present in small amount, of the order of from about 0.1 to 2% by weight (0.05 to 1 atomic percent), and by arrangement of the new hollow porous anode in a hollow porous cathode. The nickel and palladium of the alloy may be of electrolytic grade or of higher purity.

For a more complete understanding of the invention, reference is had to the accompanying drawing in which like numerals indicate like parts and in which:

FIG. 1 is a view, partly broken-away, showing a hollow porous electrode of the invention arranged as the anode in a hollow porous cathode, and, FIG. 2 is a schematic showing of a fuel cell of the type described provided with an external circuit and load and with a hollow porous electrode pair in accordance with the invention.

Referring to FIG. 1, a hollow porous anode 2 of the invention is shown suspended in spaced relation in a hollow porous cathode 1. The suspension of the anode in the cathode may be done in any suitable way. As shown, a spider 3 may be used which is made of a flexible insulating material which is resistant to attack by caustic alakali. A suitable material for the spider is polyethylene or the synthetic rubber sold under the tradename Neoprene. The anode 2 is frictionally engaged by the flexible collar of the spider 3 and the arms of the spider rest upon the rim of the cathode 1. To help place the anode in the cathode, lugs can be provided on the underside of the arms at their outer end, as shown. The nesting arrangement of the anode in the cathode is best where the electrodes are in close proximity since the internal resistance of the cell is lower in such case. A suitable spacing of the anode from the cathode is about an eighth of an inch. Terminals 4 and 5 are provided on the electrodes for electrical connection of the cathode and anode, respectively, to the external circuit containing the load for power take-off from the fuel cell. These terminals may be of copper, nickel or other sutiable metal and affixed to the electrodes in a known way as by welding.

The hollow porous anode of the invention is preferably of sintered metal construction and can be made by known techniques for the construction of sintered metal articles in which the powered metal is applied to a wire mesh and sintered. For the construction of the anode, the alloy of nickel and palladium in powder form is applied to one side of a wire mesh of nickel or nickel-plated steel or of other suitable metal and sintered. A similar layer of the powdered nickel-palladium alloy is then applied to the other side of the wire mesh and sintered. The sintered sheet of the alloy is then rolled into a cylinder and the ends of the sheet welded to form a tube. A sheet of nickel-plated or stainless steel or of the sintered nickel-palladium alloy is welded to one end of the sintered alloy cylinder to form the hollow porous anode. The thickness of the walls of the anode may be varied and preferably is from about 1/32 to 1/4 inch.

The hollow porous cathode for the fuel cell may be of carbon or nickel of known construction, or it may be constucted like the hollow porous anode from sintered nickel-palladium alloy. The wall thickness of the cathode may be generally the same as that for the anode.

The hollow anode is made non-wetting on the inner surface which comes into contact with the entering gas, the remainder of the wall of the anode being pervious to the electrolyte. For this purpose, the particles of the sintered alloy in the inner surface of the anode are provided with water-repellency by coating them with a film of wax or paraffin which may be applied thereto by spraying them with a solution of the wax or paraffin in a volatile solvent. In the event that the bottom or end wall of the anode is made of steel or other nonpervious material, the water-repellant obviously need not be applied thereto.

The hollow cathode is made non-wetting on the outer surface to limit the depth of penetration of the aqueous electrolyte thereinto. Carbon cathodes provided with water-repellancy on the outer surface are known. In the event that the hollow cathode is constructed of the sintered alloy similarly to the hollow anode of the invention, the outer surface of the cathode may be treated in like manner with wax or paraffin to render it non-wetting.

FIG. 2 shows in a schematic manner a fuel cell provided with a pair of hollow porous electrodes in which the anode 2 is supported in spaced relationship in the hollow cathode 1 as shown in greater detail in FIG. 1. The aqueous alkaline electrolyte 7 is contained in the hollow cathode and the whole is arranged in a suitable container 6 made of polyethylene, stainless steel or other material which is resistant to attack by caustic alkali solution. An external circuit 8 is electrically connected to the cell by means of the terminal 4 on the cathode 1 and terminal 5 on the anode 2. A cover (not shown) is provided for the assembly of the hollow porous anode in the hollow porous cathode which cover is provided with suitable openings for the terminals 4 and 5, an inlet for hydrogen delivery to the anode and with a vent for escape of water vapor generated in operation of the fuel cell. This cover should be made of a material which is insulating and resistant to attack by caustic alkali solution, for which polyethylene is a suitable material. The container 6 may be provided with a polyethylene cover (not shown) when the fuel cell is to be operated with delivery of an oxidizing gas, such as oxygen or chlorine, to the cathode. If the cathode 1 is to be exposed to the air as the source of the oxidizing gas, then a cover for the container 6 is omitted. The cover for the container 6 is suitably provided with openings for delivery of gas to the hollow porous electrodes, passage of the terminals 4 and 5 and with a vent for water vapor from the cell.

In operation of the fuel cell equipped with the hollow porous anode of the invention, hydrogen is fed to the anode 2 and oxygen to the cathode 1. The hydrogen diffuses through the porous wall of the sintered nickel-palladium alloy to contact the aqueous alkaline electrolyte 7, for example, a potassium hydroxide solution of 25 to 30% by weight KOH, and undergo reaction at the anode-electrolyte interface to yield hydrogen ions and electrons in accordance with Equation 1 above. The oxygen diffuses through the porous wall of the hollow cathode 1 and enters into reaction with the water of the electrolyte and electrons to yield hydroxyl ions in accordance with Equation 2. Take off of power is at the load in the external circuit 8.

In the course of the operation of the fuel cell, the palladium in the nickel-palladium alloy of the hollow anode 2, is, in part, converted to palladium black which deposits as a film on the surface of the hollow anode at the interface with the electrolyte. The formed palladium black is a catalyst for the dissociation of molecular hydrogen to atomic hydrogen which is then ionized at the anode and electrons released. As stated above, the current output is primarily dependent upon the rate at which hydrogen is dissociated. Thus, the acceleration of the rate of dissociation of molecular hydrogen increases the current ouput of the fuel cell and by the same token the efficiency of the cell. This catalysis of hydrogen dissociation is effected through a very small concentration of palladium in the anode, namely, from 0.1 to 2% by weight and is practically the equivalent of employing a pure palladium anode. A preferred nickel-palladium alloy for the anode is one of about 2% by weight palladium.

Since the principle of the invention herein described may be variously embodied without departing from the spirit or scope of the invention, it is intended that the above description shall be taken primarily by way of illustration and not in limitation except as may be required by the prior art and the appended claims.

What is claimed is:

1. A fuel cell comprising in combination a hollow porous cathode and a hollow porous anode, said hollow porous anode being formed essentially of nickel-palladium alloy containing from about 0.1 to 2% by weight palladium.

2. A fuel cell comprising in combination a hollow porous cathode and a hollow porous anode, said hollow porous anode being formed essentially of nickel-palladium alloy containing from about 0.1 to 2% by weight palladium and arranged in said hollow porous cathode in spaced relationship therein.

3. A fuel cell comprising in combination a hollow porous cathode and a hollow porous anode, said hollow porous anode being formed essentially of sintered nickel-palladium alloy containing from about 0.1 to 2% by weight palladium and arranged in said hollow porous cathode in spaced relationship therein.

4. A fuel cell comprising in combination a hollow porous cathode and a hollow porous anode, said hollow porous anode being formed essentially of sintered nickel-palladium alloy containing about 2% by weight palladium and arranged in said hollow porous cathode in spaced relationship therein.

References Cited by the Examiner

UNITED STATES PATENTS

| | | | |
|---|---|---|---|
| 913,390 | 2/09 | Junger | 136—86 |
| 1,243,111 | 10/17 | Sanders | 136—86 |
| 2,384,463 | 9/45 | Gunn et al. | 136—86 |
| 2,760,999 | 8/56 | Oblad | 252—472 |
| 2,777,805 | 1/57 | Lefrancois | 252—472 |
| 2,860,175 | 11/58 | Justi | 136—120 |
| 2,901,523 | 8/59 | Justi et al. | 136—86 |
| 2,909,568 | 10/59 | Gleim | 252—472 |
| 2,913,511 | 11/59 | Grubb | 136—86 |

FOREIGN PATENTS

| | | |
|---|---|---|
| 794,471 | 5/58 | Great Britain. |
| 350,100 | 10/05 | France. |

JOHN H. MACK, *Primary Examiner.*

JOHN R. SPECK, *Examiner.*